(12) United States Patent
Ando et al.

(10) Patent No.: US 12,111,499 B2
(45) Date of Patent: Oct. 8, 2024

(54) LIGHT GUIDE MEMBER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hiroshi Ando, Nisshin (JP); Kodai Takeda, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 199 days.

(21) Appl. No.: 17/861,909

(22) Filed: Jul. 11, 2022

(65) Prior Publication Data

US 2023/0022565 A1 Jan. 26, 2023

(30) Foreign Application Priority Data

Jul. 16, 2021 (JP) ................... 2021-118058

(51) Int. Cl.
*G02B 6/24* (2006.01)
*G02B 5/02* (2006.01)
*G02B 6/34* (2006.01)
*G02B 27/00* (2006.01)

(52) U.S. Cl.
CPC ........... *G02B 6/34* (2013.01); *G02B 27/0018* (2013.01)

(58) Field of Classification Search
CPC ...... G02B 6/34; G02B 27/0018; G02B 5/045; G02B 6/0036; G02B 6/002
USPC .............................................. 385/36
See application file for complete search history.

(56) References Cited

U.S. PATENT DOCUMENTS

| | | | | |
|---|---|---|---|---|
| 5,034,764 A | * | 7/1991 | Inabata | G02B 23/14 |
| | | | | 396/383 |
| 5,914,760 A | * | 6/1999 | Daiku | G02B 6/0053 |
| | | | | 349/95 |
| 9,557,466 B2 | * | 1/2017 | Fattal | G02B 6/0031 |
| 9,684,113 B2 | * | 6/2017 | Kim | G02B 6/0036 |

(Continued)

FOREIGN PATENT DOCUMENTS

| | | |
|---|---|---|
| JP | 2001056451 A | 2/2001 |
| JP | 2015-020669 A | 2/2015 |

(Continued)

*Primary Examiner* — Kaveh C Kianni
(74) *Attorney, Agent, or Firm* — Posz Law Group, PLC (57) ABSTRACT

A light guide member includes an incident portion, an emission portion, a reflection portion, and an inclined portion. An internal reflection angle inside the reflection portion and the emission portion is larger than an incident angle of an external light with respect to a first normal line that is a normal line of the emission portion. A first inclination angle that is an inclination angle of the incident portion with respect to the first normal line is smaller than the internal reflection angle. A height from the emission portion to a second side of the incident portion is larger than a distance between the emission portion and the reflection portion. A second inclination angle that is an inclination angle of the inclined portion with respect to the first normal line is smaller than the internal reflection angle.

16 Claims, 9 Drawing Sheets

(56) References Cited

U.S. PATENT DOCUMENTS

| | | | | |
|---|---|---|---|---|
| 2002/0034016 A1* | 3/2002 | Inoguchi | G03B 21/10 | 359/632 |
| 2003/0174492 A1* | 9/2003 | Ohkawa | G02B 6/0068 | 362/339 |
| 2004/0105157 A1* | 6/2004 | Matsushita | G02B 5/0263 | 359/584 |
| 2004/0130882 A1* | 7/2004 | Hara | G02B 6/002 | 362/330 |
| 2006/0291243 A1* | 12/2006 | Niioka | F21V 33/0052 | 362/606 |
| 2007/0200974 A1* | 8/2007 | Daiku | G02B 6/0025 | 349/65 |
| 2008/0297696 A1* | 12/2008 | Banerjee | G02B 5/3058 | 362/617 |
| 2009/0122576 A1* | 5/2009 | Sato | G02B 6/0038 | 362/620 |
| 2010/0073925 A1* | 3/2010 | Vissenberg | G02F 1/133605 | 257/98 |
| 2010/0195022 A1* | 8/2010 | Shikii | G02B 6/0028 | 362/626 |
| 2012/0134159 A1* | 5/2012 | Kamo | G02B 27/0994 | 362/308 |
| 2013/0083404 A1* | 4/2013 | Takagi | G02B 27/0149 | 359/633 |
| 2013/0141937 A1* | 6/2013 | Katsuta | G02B 6/0035 | 362/606 |
| 2014/0092482 A1 | 4/2014 | Dubroca et al. | | |
| 2014/0146561 A1* | 5/2014 | Yuki | G02B 6/0053 | 362/606 |
| 2014/0340759 A1* | 11/2014 | Yano | G02B 27/0172 | 359/629 |
| 2015/0153574 A1* | 6/2015 | Komatsu | G02B 27/017 | 345/8 |
| 2016/0320545 A1* | 11/2016 | Hirayama | G02B 6/0061 | |
| 2016/0327852 A1* | 11/2016 | Watanabe | G02B 27/0081 | |
| 2017/0031085 A1* | 2/2017 | Lim | G02B 6/0055 | |
| 2017/0052375 A1* | 2/2017 | Takeda | G02B 6/29328 | |
| 2017/0219761 A1* | 8/2017 | Fukui | F21S 43/245 | |
| 2017/0219830 A1* | 8/2017 | Komatsu | G02B 27/0172 | |
| 2017/0363798 A1* | 12/2017 | Hirayama | G02B 6/0036 | |
| 2018/0172893 A1* | 6/2018 | Fattal | G02B 6/0016 | |
| 2020/0127601 A1* | 4/2020 | Towe | F24S 23/12 | |
| 2020/0201043 A1* | 6/2020 | Sugiyama | G09F 9/00 | |
| 2021/0132281 A1 | 5/2021 | Fattal et al. | | |
| 2021/0294018 A1* | 9/2021 | Kanbayashi | G02B 6/0053 | |

FOREIGN PATENT DOCUMENTS

| | | |
|---|---|---|
| JP | 2015-143087 A | 8/2015 |
| JP | 2017-146494 A | 8/2017 |
| JP | 2018163252 A | 10/2018 |

\* cited by examiner

LIGHT GUIDE MEMBER

CROSS REFERENCE TO RELATED APPLICATION

The present application claims the benefit of priority from Japanese Patent Application No. 2021-118058 filed on Jul. 16, 2021. The entire disclosure of the above application is incorporated herein by reference.

TECHNICAL FIELD

The present disclosure relates to a light guide member.

BACKGROUND

Conventionally, there has been known a light guide member that guides light from an external scene.

SUMMARY

The present disclosure provides a light guide member including an incident portion, an emission portion, a reflection portion, and an inclined portion. An internal reflection angle inside the reflection portion and the emission portion is larger than an incident angle of an external light in a light guide cross section that is a plane defined by a first normal line and a second normal line, the first normal line is a normal line of the emission portion, the second normal line is a normal line of the incident portion, and the incident angle is an angle of the external light with respect to the first normal line. A first inclination angle that is an inclination angle of the incident portion with respect to the first normal line is smaller than the internal reflection angle. A height from the emission portion to a second side of the incident portion is larger than a distance between the emission portion and the reflection portion. A second inclination angle that is an inclination angle of the inclined portion with respect to the first normal line is smaller than the internal reflection angle.

BRIEF DESCRIPTION OF DRAWINGS

Objects, features and advantages of the present disclosure will become apparent from the following detailed description made with reference to the accompanying drawings. In the drawings.

DETAILED DESCRIPTION

A blind spot assisting device according to a related art includes a transflective mirror and a reflective mirror. The blind spot assisting device reflects and reciprocates a light from a blind spot region between the transflective mirror and the reflection mirror, and emits the light toward a user.

In the blind spot assisting device, when a distance between the transflective mirror and the reflection mirror is narrowed, the image quality is deteriorated due to the increase in the number of reflections and the discontinuity of the visible image is increased. Therefore, it is difficult to reduce the thickness of the blind spot assisting device.

A light guide member according to an aspect of the present disclosure includes an incident portion, an emission portion, a reflection portion, and an inclined portion. The incident portion has a first side and a second side opposite to the first side, and is configured to allow an external light from an external scene to be incident on. The emission portion is in contact with the first side of the incident portion to be inclined with respect to the incident portion, and configured to transmit a part of the external light incident on the emission portion and reflect another part of the external light incident on the emission portion. The reflection portion is disposed in parallel with the emission portion to be separated from the emission portion, and is configured to reflect the external light incident on the reflection portion. The inclined portion connects the second side of the incident portion and a side of the reflection portion close to the incident portion. An internal reflection angle inside the reflection portion and the emission portion is larger than an incident angle of the external light in a light guide cross section that is a plane defined by a first normal line and a second normal line, the first normal line is a normal line of the emission portion, the second normal line is a normal line of the incident portion, and the incident angle is an angle of the external light with respect to the first normal line. A first inclination angle that is an inclination angle of the incident portion with respect to the first normal line is smaller than the internal reflection angle. A height from the emission portion to the second side of the incident portion in a direction parallel to the first normal line is larger than a distance between the emission portion and the reflection portion. A second inclination angle that is an inclination angle of the inclined portion with respect to the first normal line is smaller than the internal reflection angle.

Since the internal reflection angle of the light guide member according to the above aspect of the present disclosure is larger than the incident angle of the external light from the external scene, a thickness of the light guide member can be reduced while suppressing the number of reflections inside the light guide member. Further, since the first inclination angle and the second inclination angle are smaller than the internal reflection angle, and the height from the emission portion to the second side is larger than the distance between the emission portion and the reflection portion, the continuity of the visible image can be secured. Therefore, it is possible to realize a light guide member that can be made thinner while avoiding the discontinuity of the visible image and the increase in the number of reflections.

The following will describe embodiments of the present disclosure with reference to the accompanying drawings.

First Embodiment

<1-1. Configuration>

A configuration of a light guide member 101 according to a first embodiment will be described with reference to FIG. 1 and FIG. 2. The light guide member 101 includes an incident portion 10, an emission portion 21, a reflection portion 30, an inclined portion 40, a terminal portion 50, and a translucent member 60. The incident portion 10, the emission portion 21, the reflection portion 30, the inclined portion 40, the terminal portion 50, and the translucent member 60 are formed of a translucent resin material.

The incident portion 10 is a surface including a first side 10a and a second side 10b, and light L from an external scene (that is, an external light) is incident at an incident angle θ. The emission portion 21 is in contact with the first side 10a to be inclined with respect to the incident portion 10. The emission portion 21 transmits a part of the light L incident on the emission portion 21 and reflects another part at an internal reflection angle φ. Here, a plane defined by the normal line of the emission portion 21 (hereinafter, referred to as a first normal line l1) and the normal line of the incident portion 10 (hereinafter, referred to as second normal line l2) is referred to as a light guide cross section. FIG. 1 shows the light guide cross section of the light guide member 101. As shown in FIG. 1, the incident angle θ is an angle of the light L with respect to the first normal line l1.

The incident portion 10 is inclined at a first inclination angle ψ with respect to the first normal line l1. The first side 10a and the second side 10b are sides perpendicular to the light guide cross section. The second side 10b is separated from the emission portion 21 by a height Td.

The reflection portion 30 is a plane arranged in parallel with the emission portion 21 to be separated from the emission portion 21. The reflection portion 30 is separated from the emission portion 21 by a light guide width T. The reflection portion 30 totally reflects the light L incident on the reflection portion 30. Therefore, the internal reflection angle φ is set to satisfy the condition of φ>sin$^{-1}$(1/n), where n is a refractive index of the translucent member 60.

The inclined portion 40 is a plane connecting the second side 10b and a side of the reflection portion 30 close to the incident portion 10. The inclined portion 40 is inclined at a second inclination angle ξ with respect to the first normal line l1. A light absorption film is arranged on the inclined portion 40. The light absorption film suppresses the reflection of the light L that has reached the inclined portion 40.

Figure 1:
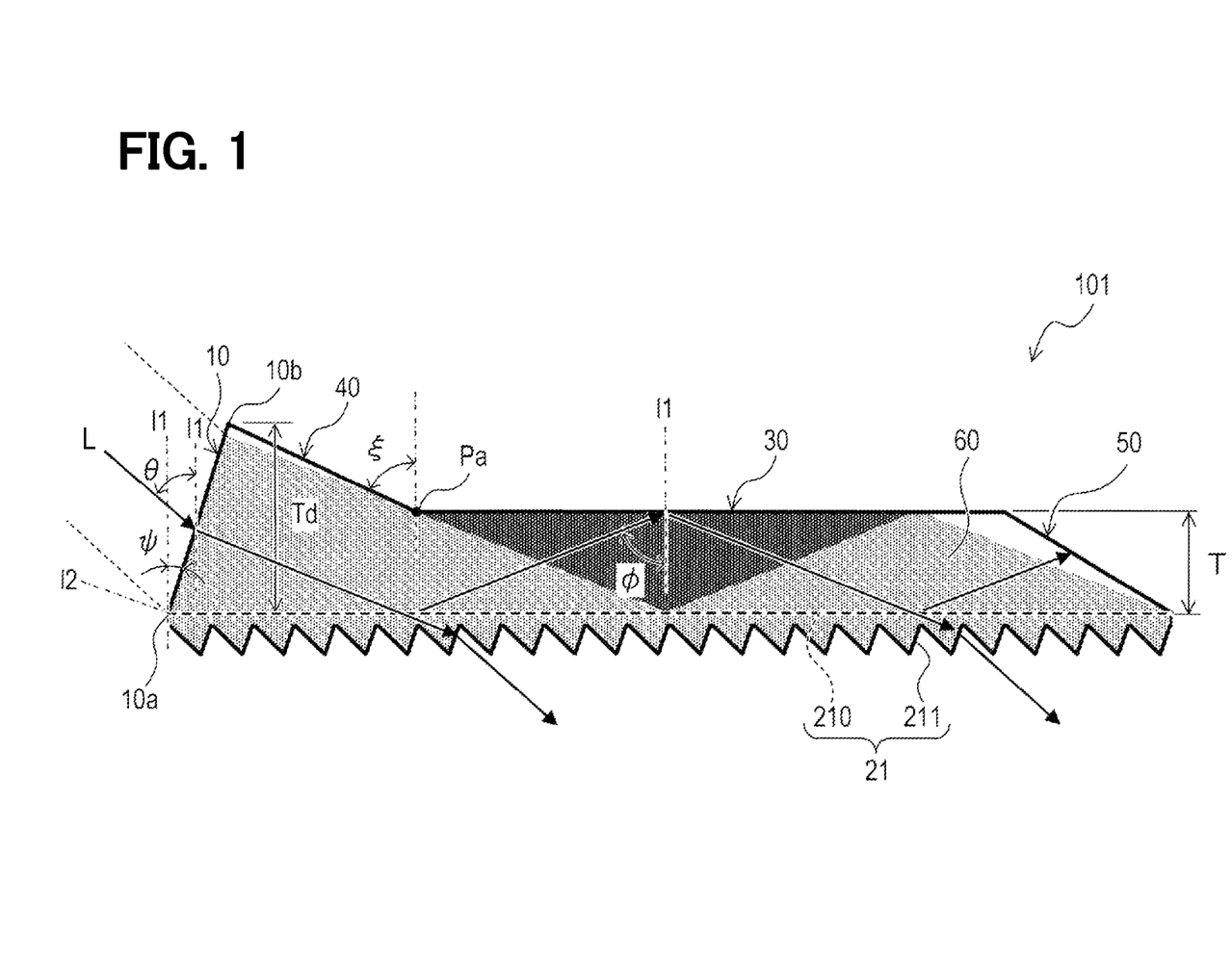
FIG. 1 is a diagram showing a light guide cross section of a light guide member according to a first embodiment.
Figure 2:
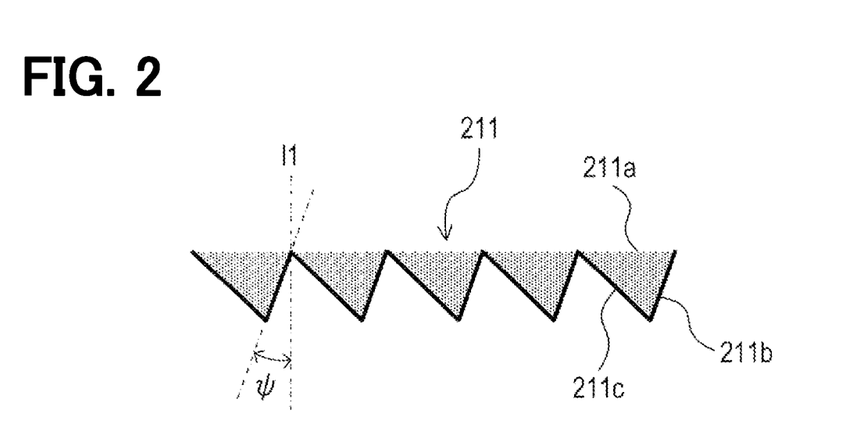
FIG. 2 is a diagram showing a configuration of an emission portion of the light guide member according to the first embodiment.

The light absorption film suppresses reflection when a light ray that does not reach the emission portion 21 among light rays incident on the incident portion 10 in FIG. 1 (that is, a light ray incident at a white portion above light rays indicated by dotted lines and passing through a point Pa) directly reaches the inclined portion 40, and suppresses generation of a ghost image.

The terminal portion 50 is a plane connecting the emission portion 21 and the reflection portion 30. The translucent member 60 fills the inside surrounded by the emission portion 21, the reflection portion 30, the inclined portion 40, and the terminal portion 50. That is, the light guide member 101 has a solid structure.

The emission portion 21 includes a transmission and reflection surface 210 and a prism array 211. The transmission and reflection surface 210 is in contact with the translucent member 60 and is provided in parallel with the reflection portion 30. The transmission and reflection surface 210 reflects a part of the light L incident on the transmission and reflection surface 210 and transmits another part of the light L.

The prism array 211 is provided on an outer surface of the transmission and reflection surface 210, and includes multiple prisms 211a. The prism array 211 converts the angle of the light L transmitted through the transmission and reflection surface 210 by a refraction action and emits the light L. Specifically, the prism array 211 converts the incident angle φ into the emission angle θ by the refraction action. As a result, the angle of the light L emitted from the emission portion 21 becomes equal to the incidence angle θ of the light L incident on the light guide member 101. Therefore, the visible image of the external scene is displayed in the direction in which the external scene actually exists. The prism array 211 may be changed to a prism sheet in which multiple prisms 211a are arranged, or may be changed to another periodic structure.

Each of the prisms 211a includes an emission side surface 211b and an emission facing surface 211c that faces the emission side surface 211b. The light L incident on the prism array 211 is emitted from the emission side surface 211b and is not emitted from the emission facing surface 211c.

The emission side surface 211b is inclined at a third inclination angle ψ with respect to the first normal line l1. The third inclination angle ψ is equal to the first inclination angle ψ. That is, the emission side surface 211b is parallel to the incident portion 10. A light absorption film is disposed on the emission facing surface 211c. Accordingly, it is possible to suppress external light that reaches the emission portion 21 from the outside of the emission portion 21 from being emitted from the emission facing surface 211c or being reflected by the emission facing surface 211c. As a result, it is possible to suppress the mixing of noise light into the light L from the external scene. Further, it is possible to suppress the mixing of noise light due to the reflection of the emission light rays that have reached the emission facing surface 211c from the inside of the prism.

The light guide member 101 is configured such that the incident angle θ, the internal reflection angle φ, the first inclination angle ω, the second inclination angle ξ, the light guide width T, and the height Td satisfy predetermined conditions. The predetermined conditions are relationships that can suppress the increase in the number of reflections inside the light guide member 101 and the discontinuity of the visible image, suppress the ghost image, and decrease the thickness of the light guide member 101. The predetermined conditions will be described below.

Figure 3:
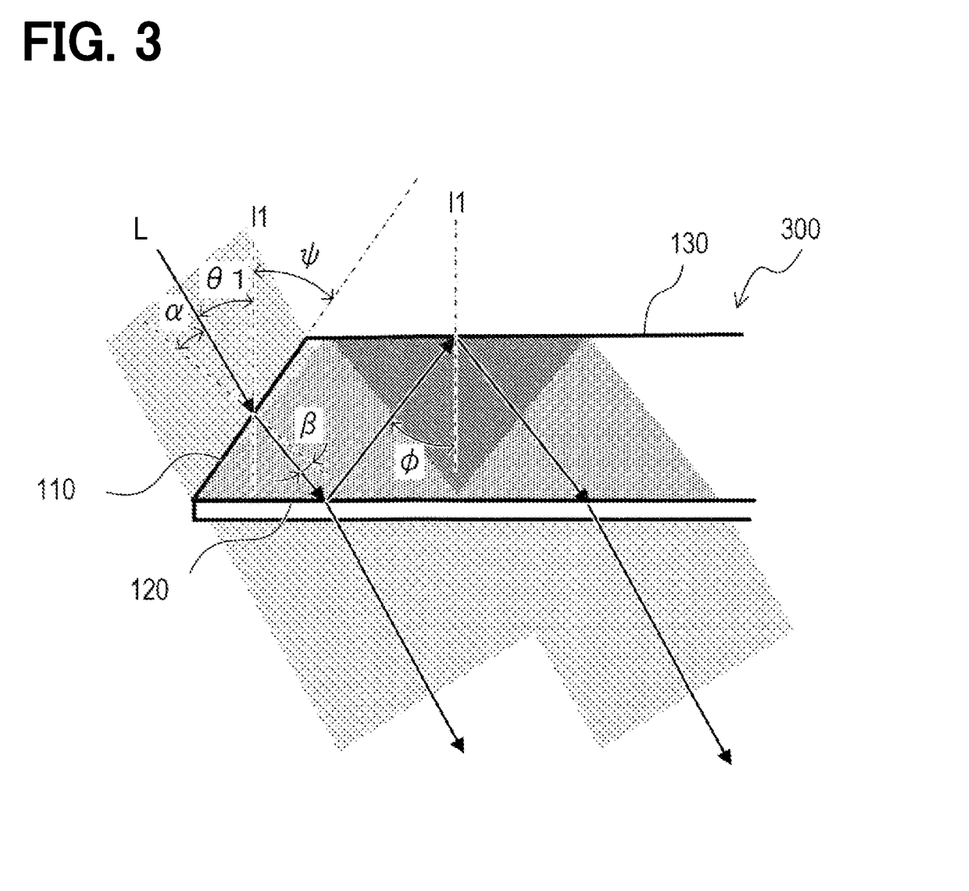
FIG. 3 is a diagram showing a light guide of a light ray from an external scene having a central angle of view in a light guide member according to a reference example.
Figure 4:
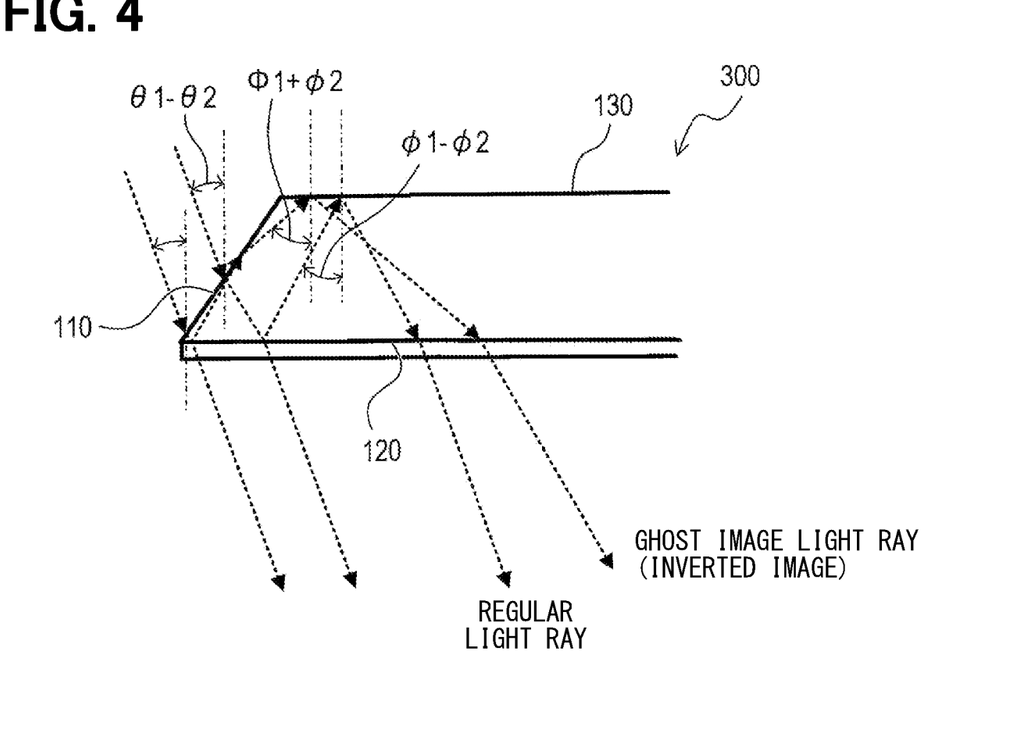
FIG. 4 is a diagram showing a light guide of a light ray from the external scene having an angle of view smaller than the central angle of view in the light guide member according to the reference example.

The incident angle θ of the light L from the external scene may have a range of θ1−θ2 to θ1+θ2. The incident angle θ1−θ2 corresponds to a first incident angle, and the incident angle θ1+θ2 corresponds to a second incident angle larger than the first incident angle. FIG. 3 shows a light guide of a light ray having the central angle of view $\theta1$ in the incident angle range $\theta1-\theta2$ to $\theta1+\theta2$. On the other hand, FIG. 4 shows a light guide of a light ray having the smallest angle of view $\theta1-\theta2$ in the incident angle range $\theta1-\theta2$ to $\theta1+\theta2$. As shown in FIG. 4, when the light ray having the angle of view $\theta1-\theta2$ is incident on a light guide member 300 according to a reference example, the light ray incident on a transmission and reflection surface 120 is reflected at an internal reflection angle $\varphi1-\varphi2$. At this time, if an inclination angle $\psi$ of an incident surface 110 is $\psi>\varphi1-\varphi2$, the light ray incident on an end near the transmission and reflection surface 120 reaches the incident surface 110 after being reflected by the transmission and reflection surface 120 before reaching a reflection surface 130, and is totally reflected by the incident surface 110. Therefore, the optical path of the reciprocating reflection changes according to the incident position on the incident surface 110. As a result, in addition to a light ray having a regular internal reflection angle $\varphi1-\varphi2$, a light ray having an internal reflection angle $\varphi1+\varphi2$ is generated. The reflection angle $\varphi1-\varphi2$ corresponds to a first reflection angle, and the reflection angle $\varphi1+\varphi2$ corresponds to a second reflection angle larger than the first reflection angle. Since the light ray having the internal reflection angle $\varphi1+\varphi2$ have the same internal reflection angle as the light ray from the angle $\theta1+\theta2$, the light ray having the internal reflection angle $\varphi1+\varphi2$ is visually recognized as a ghost image (that is, an inverted image) that can be seen at the position where the angle is inverted. Therefore, by setting $\psi \leq \varphi1-\varphi2<\varphi1(=\varphi)$, it is possible to prevent the incident light ray from reaching the incident surface 110 after being reflected by the transmission and reflection surface 120 and forming a ghost image.

Figure 5:
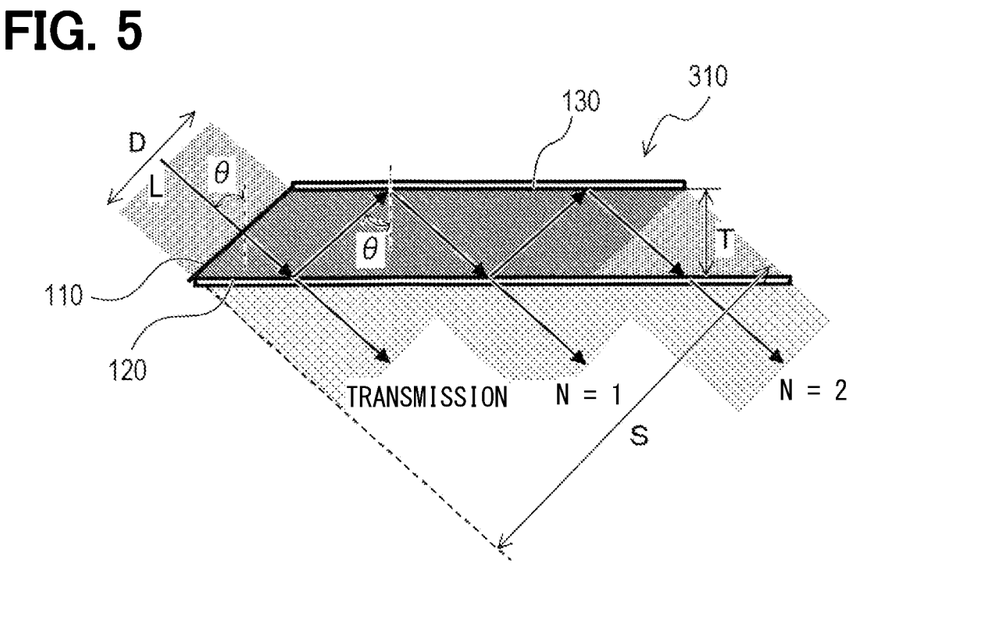
FIG. 5 is a diagram showing a thickness of a light guide member in a case where an incident angle and an internal reflection angle are equal to each other.

A light guide member 310 according to another reference example shown in FIG. 5 includes an incident surface 110, a transmission and reflection surface 120, and a reflection surface 130, and has a hollow structure. An incident light having an optical path width D is incident on the incident surface 110. The transmission and reflection surface 120 reflects a part of the incident light at an internal reflection angle $\theta$ and transmits another part. The light incident on the inside of the light guide member 310 is reflected and reciprocated N times, and is emitted from the transmission and reflection surface 120 to a display visible region S. The width of the display visible region S corresponds to the width of the light emitted from the transmission and reflection surface 120. When the width of the display visible region S increases, the range of the external scene visible to a user can increase.

Since the internal reflection angle $\varphi$ is equal to the incident angle $\theta$, the light guide width $T=D/(2 \sin \theta)$ and $N+1=S/D$. Therefore, $T=S/(2(N+1)\sin \theta)$. Therefore, by increasing the number of reflection reciprocation N, the light guide width T can be reduced and the thickness of the light guide member 310 can be reduced.

However, when the number of reflection reciprocation N is increased, the variation in the brightness of the emitted light increases. Further, when the number of reflection reciprocation N is increased, the boundary of the optical path of the emitted light from the transmission and reflection surface 120 increases. As a result, the discontinuity of the visible image in the display visible region S increases.

Figure 6:
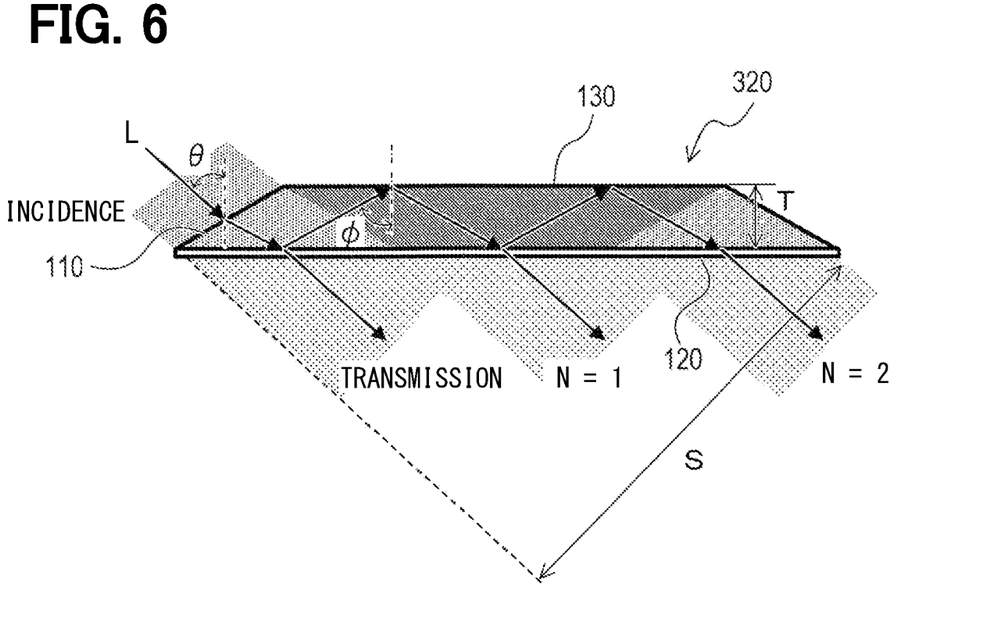
FIG. 6 is a diagram showing a thickness of a light guide member in a case where an internal reflection angle is larger than an incident angle.

A light guide member 320 according to another reference example shown in FIG. 6 has a solid structure in which a transmission and reflection surface 120 and a reflection surface 130 are connected and integrated by a transmission member having a refractive index n. An internal reflection angle $\varphi$ inside the light guide member 320 is larger than an incident angle $\theta$. Therefore, $T=S/(2(N+1)\sin \varphi))<S/(2(N+1) \sin \theta)$ is satisfied, and the light guide width T is smaller than when the internal reflection angle $\varphi$ is equal to the incident angle $\theta$.

Figure 7:
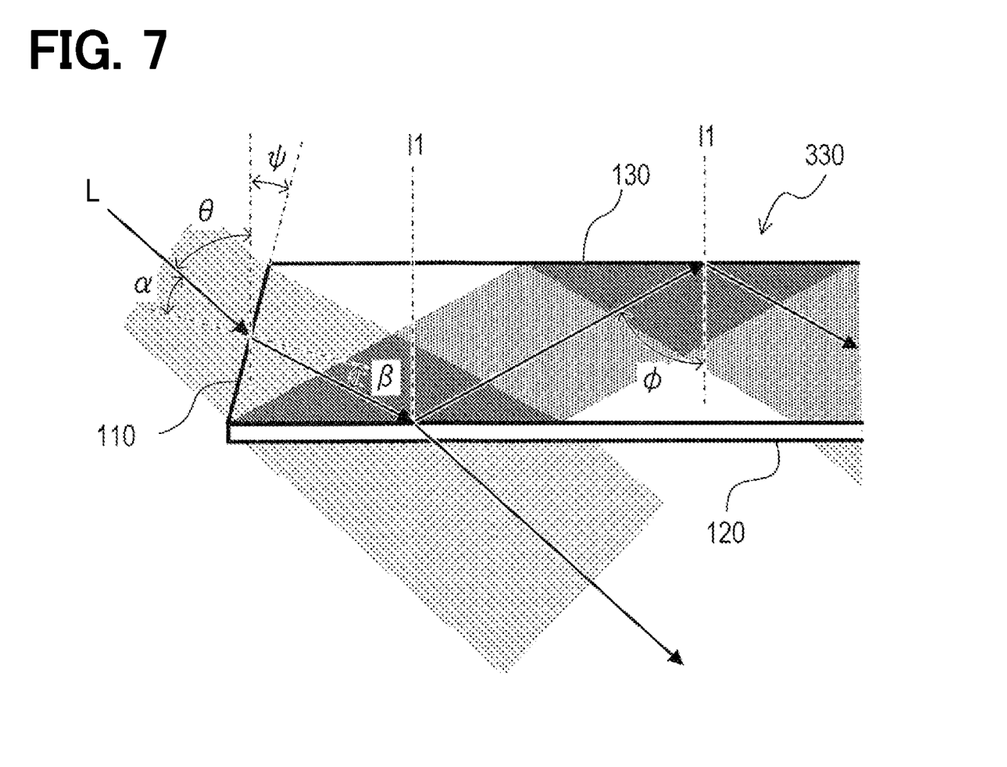
FIG. 7 is a diagram showing an incident angle, a first inclination angle, and an internal reflection angle in a light guide member according to a reference example.

However, if an attempt is made to compress the optical path inside the light guide member 320 by setting the incident angle $\theta<$the internal reflection angle $\varphi$, the first inclination angle $\psi$ of the incident surface 110 cannot be increased. As a result, as shown in FIG. 7, the omission of display occurs in the display visible region S, and the visible image becomes discontinuous. Therefore, in order to avoid the discontinuity, it is necessary to bring the first inclination angle $\psi$ closer to the internal reflection angle $\varphi$.

On the other hand, in order to reduce the thickness, it is necessary to increase the difference between a first angle $\alpha$ and a second angle $\beta$. That is, in order to reduce the thickness, it is necessary to increase the first angle $\alpha$. Here, $\alpha=\pi/2-(\theta+\psi)$, $\beta=\pi/2-(\varphi+\psi)$. Further, in order to reduce the thickness, it is necessary to satisfy the condition of $\theta<\varphi$, and in order to satisfy the condition of $\theta<\varphi$, it is necessary to satisfy the condition of $\alpha>0$. Further, since $\theta+\alpha=\varphi+\beta=\pi/2-\psi$, when $\psi$ and $\varphi$ substantially match, it is necessary to satisfy the condition of $\theta+<\varphi+\psi<\pi/2$. That is, in order to reduce the thickness and avoid the discontinuity of the visible image, $\theta<\pi/4$ must be satisfied. That is, it is impossible to avoid discontinuity and reduce the thickness with respect to the light from the external scene having an incident angle $\theta$ larger than $\pi/4$.

Therefore, in order to avoid discontinuity of the visible image while reducing the thickness even if the incident angle $\theta$ exceeds $\pi/4$, it is necessary to set the height Td to be larger than the light guide width T and set the second inclination angle $\xi$ to be smaller than the internal reflection angle $\varphi$ while satisfying $\psi<\pi/4<\varphi$.

Figure 8:
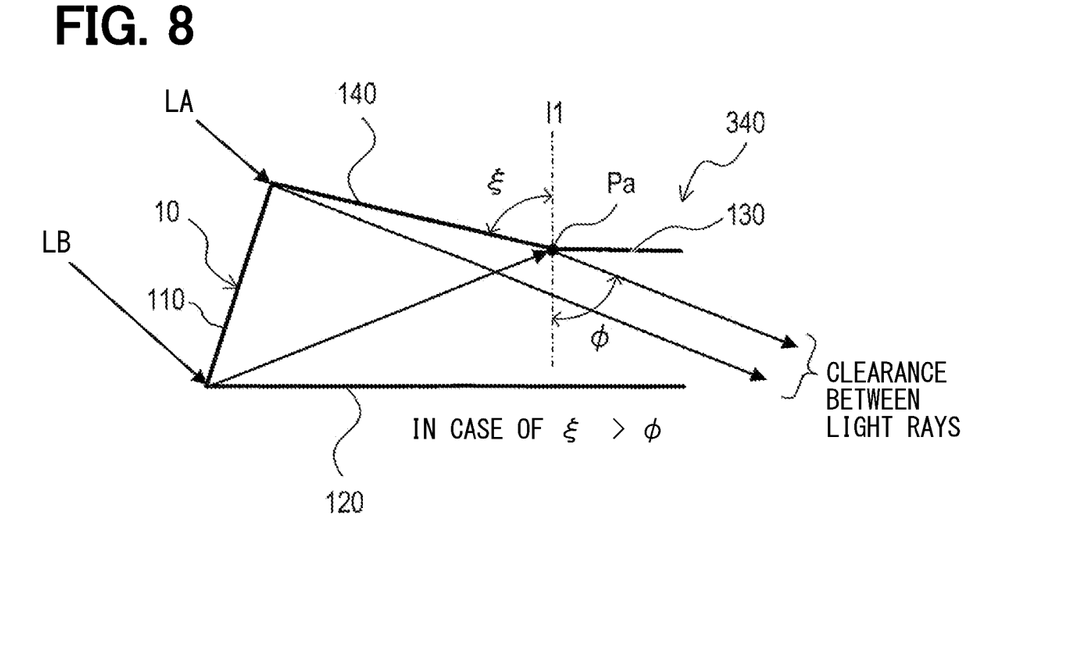
FIG. 8 is a diagram showing a relationship between a second inclination angle and the continuity of a visible image in a light guide member according to a reference example.

FIG. 8 shows a light guide member 340 configured so that the second inclination angle $\xi$ is larger than the internal reflection angle $\varphi$. When $\xi>\varphi$, a light ray LA at the uppermost end of the light L incident on the incident surface 110 does not pass through the end portion Pa. Therefore, the omission of optical path occurs between the light ray LA and a light ray LB, and the visible image in the display visible region S becomes discontinuous. The light ray LB is a light ray that is incident from the incident surface 110, is reflected by the transmission and reflection surface 120, and reaches the end portion Pa. The end portion Pa is an end portion of the reflection surface 130 connected to an inclined surface 140. On the other hand, when $\xi<\varphi$, since the light ray LA passes through the end portion Pa, the omission of optical path does not occur between the light ray LA and the light ray LB, and the continuity of the visible image in the display visible region S is ensured.

Therefore, the predetermined conditions for reducing the thickness, suppressing the ghost image, and suppressing the increase in the number of repetitions and the discontinuity of the visible image are as follows: (i) the incident angle $\theta<$the internal reflection angle $\varphi$; (ii) the first inclination angle $\psi<$the internal reflection angle $\varphi$; (iii) the height Td$<$the light guide width T; and (iv) the second inclination angle $\xi<$the internal reflection angle $\varphi$. By adjusting the height Td in the range of Td$>$T with respect to the desired incident angle $\theta$, it is possible to realize the light guide member 101 that also satisfies the conditions (i), (ii), and (iv).

The height Td is minimized when the light rays incident on the inclined surface 140 are parallel to the inclined surface 140. If the height Td is smaller than this, the incident light rays interfere with the inclined surface 140. That is, when the distance between the intersection of the light ray LA at the uppermost end and the light ray LB at the lowermost end and the transmission and reflection surface 120 coincides with the light guide width T, the height Td satisfies the relationship of Td≥2T×tan φ/(tan φ+tan ψ). When ψ<φ<π/2, the relationship of Td>T is always satisfied. Further, the value required for the height of Td becomes the maximum (that is, the minimum required height) when the angle ψ of the incident portion is small and the inclination angle ξ of the inclined surface 140 is small. The condition for minimizing the inclination angle ξ is that the incident angle θ is zero. Since a light ray having θ=0 can be incident only when the first inclination angle ψ is a positive value, the minimum value of the first inclination angle ψ is 0. When the first inclination angle ψ=0, the height Td of the incident portion is Td=2T from the above equation. Since it is desirable to make the height of the incident portion as small as possible in order to reduce the thickness of the light guide member, the maximum value of Td that can handle a wide range of incident angles without using unnecessary height is 2T.

Figure 9:
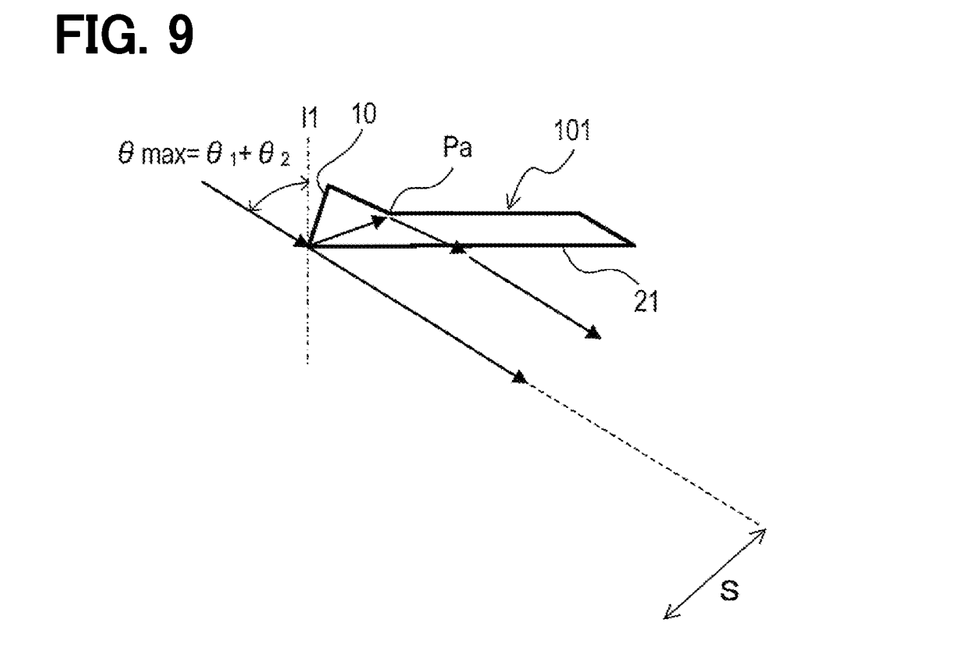
FIG. 9 is a diagram showing a light guide at a maximum incident angle in a light guide member according to a reference example.

Further, when the incident angle θ of the light L from the external scene has a range of θ1−θ2 to θ1+θ2, if the light range having the maximum incident angle θ1+θ2 does not pass through the end portion Pa, an omission of the optical path occurs and the visible image becomes discontinuous. Therefore, as shown in FIG. 9, the internal reflection angle φ is set to the reflection angle when the incident angle θ is the maximum incident angle θ1+θ2 so that the light ray having the maximum incident angle θ1+θ2 passes through the end portion Pa.

Further, when the range of the incident angle θ is θ1−θ2 to θ1+θ2 and the range of the internal reflection angle φ is φ1−φ2 to φ1+φ2, the light guide member 101 is configured to satisfy the condition of ξ<φ1−φ2 in order to ensure the continuity of the visible image.

<1-2. Effects>

According to the first embodiment detailed above, the following effects may be obtained.

(1) Since the internal reflection angle φ is larger than the incident angle θ, the thickness of the light guide member 101 can be reduced while suppressing the number of reflections inside the light guide member 101. Further, since the first inclination angle ψ and the second inclination angle ξ are smaller than the internal reflection angle φ and the height Td is larger than the light guide width T, the continuity of the visible image in the display visible region S can be ensured. Further, since the height Td is equal to or less than twice the light guide width T, the height of the incident portion can be limited to a certain level or less. Therefore, it is possible to realize a light guide member that can be made thinner while avoiding the discontinuity of the visible image and the increase in the number of reflections.

(2) Since the emission portion 21 has a double structure including the transmission and reflection surface 210 and the prism array 211, the emission portion 21 can reflect a part of the light L incident on the emission portion 21 and can emit another part of the light L at the same angle as the incident angle θ.

(3) Since the light absorbing member is provided on the inclined portion 40, it is possible to suppress the reflection of the light L that reaches the inclined portion 40 from the inside of the light guide member 101. As a result, the generation of a ghost image in the display visible region S can be suppressed.

Second Embodiment

<1. Differences from First Embodiment>

A basic configuration of a second embodiment is similar to that of the first embodiment, and therefore, differences from the first embodiment will be described below. Note that the same reference numerals as those in the first embodiment indicate the same configuration, and refer to the preceding descriptions.

Figure 10:
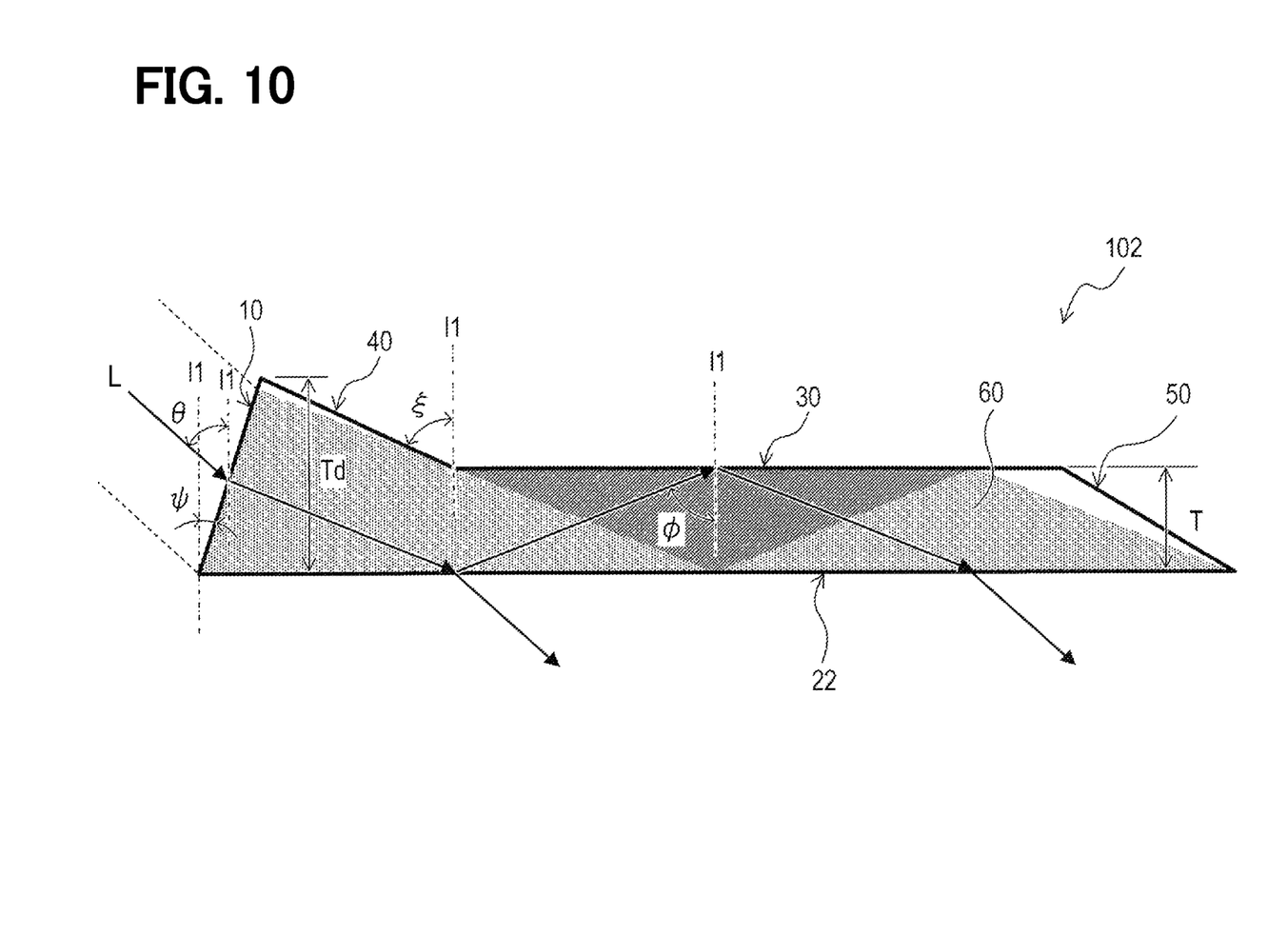
FIG. 10 is a diagram showing a light guide cross section of a light guide member according to a second embodiment.

The light guide member 101 according to the first embodiment includes the emission portion 21. As shown in FIG. 10, a light guide member 102 according to the second embodiment is different from the first embodiment in that the light guide member 102 includes an emission portion 22 instead of the emission portion 21.

Figure 11:
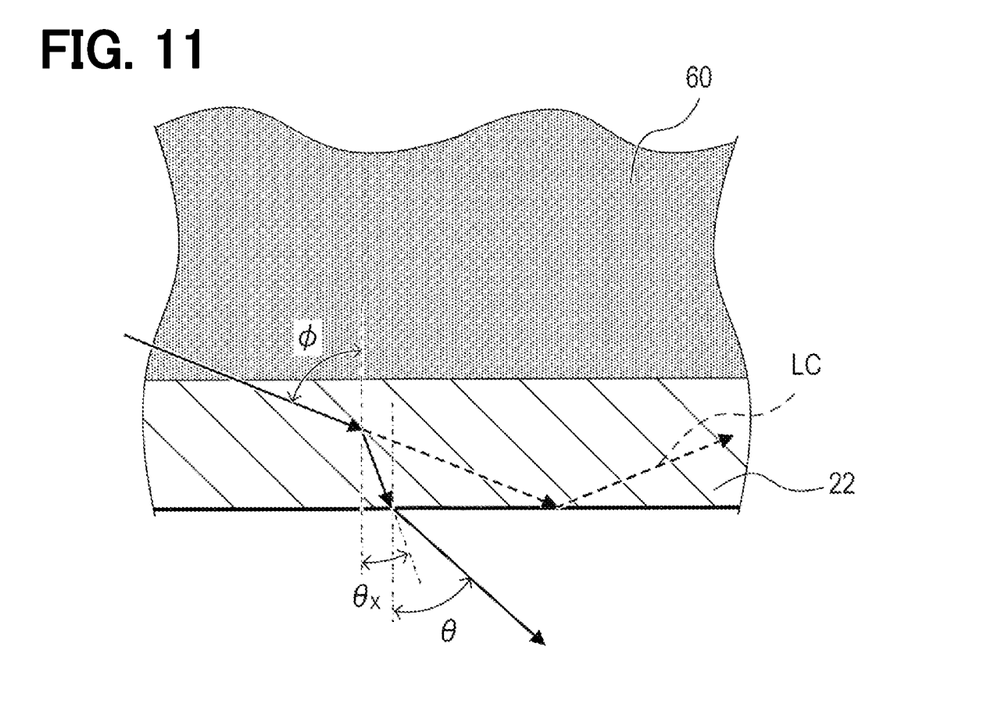
FIG. 11 is a diagram showing a configuration of an emission portion according to the second embodiment.

FIG. 11 shows an enlarged view of a part of the emission portion 22. The emission portion 22 includes a transmissive hologram. The emission portion 22 converts an angle φ into an angle θx by transmission diffraction. That is, the emission portion 22 converts a light ray incident at the angle φ into a light ray having the angle θx.

Here, by setting θx so as to satisfy the condition of sin θx=sin θ/n, the light ray having the angle θx is emitted from the emission portion 22 at an angle θ. Therefore, the angle of the light L emitted from the emission portion 22 is equal to the incident angle θ of the light L incident on the light guide member 102.

Further, by appropriately adjusting the diffraction efficiency of the hologram, a light ray diffracted by the hologram (that is, a light ray having an angle θx) and a light ray LC that passes through the hologram and is reflected at the interface with air can be divided. The emission portion 22 may be any member having a diffraction function, and may also be a diffraction optical member such as a diffraction grating as well as the hologram. The diffraction grating and the hologram are examples of a first periodic structure.

<2-2. Effects>

According to the second embodiment described in detail above, the effects (1) and (3) of the above-described first embodiment are obtained, and further, the following effect can be obtained.

(4) Since the emission portion 22 includes the hologram, by appropriately adjusting the diffraction efficiency, the emission portion 22 can reflect a part of the light L incident on the emission portion 22 and can emit another part of the light L at the same angle as the incident angle θ.

Third Embodiment

<3-1. Differences from First Embodiment>

A basic configuration of a third embodiment is the same as that of the first embodiment, and therefore, differences from the first embodiment will be described below. Note that the same reference numerals as those in the first embodiment indicate the same configuration, and refer to the preceding descriptions.

Figure 12:
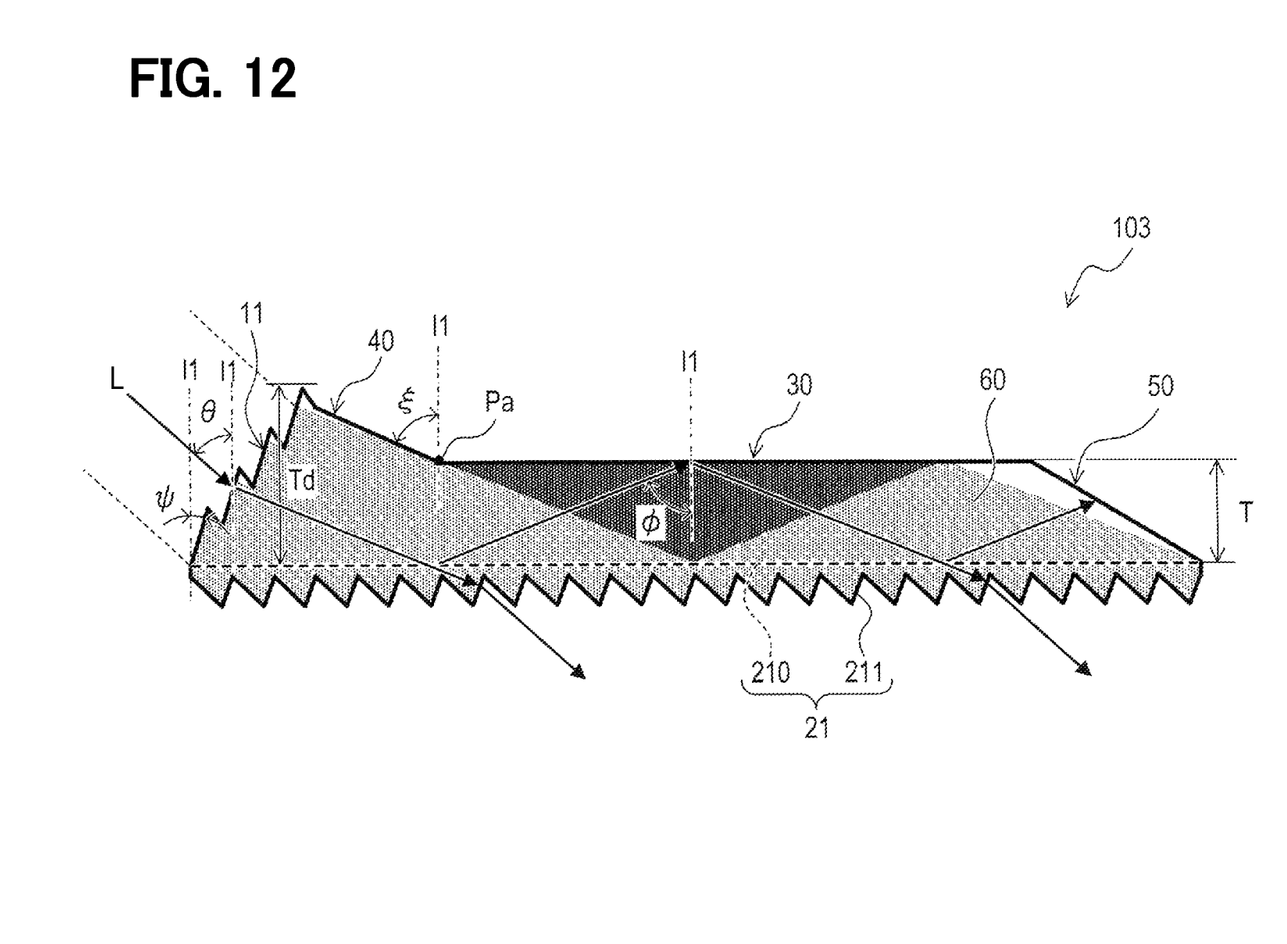
FIG. 12 is a diagram showing a light guide cross section of a light guide member according to a third embodiment.

The light guide member 101 according to the first embodiment includes the incident portion 10. As shown in FIG. 12, a light guide member 103 according to the third embodiment is different from the first embodiment in that an incident portion 11 is provided instead of the incident portion 10.

Figure 13:
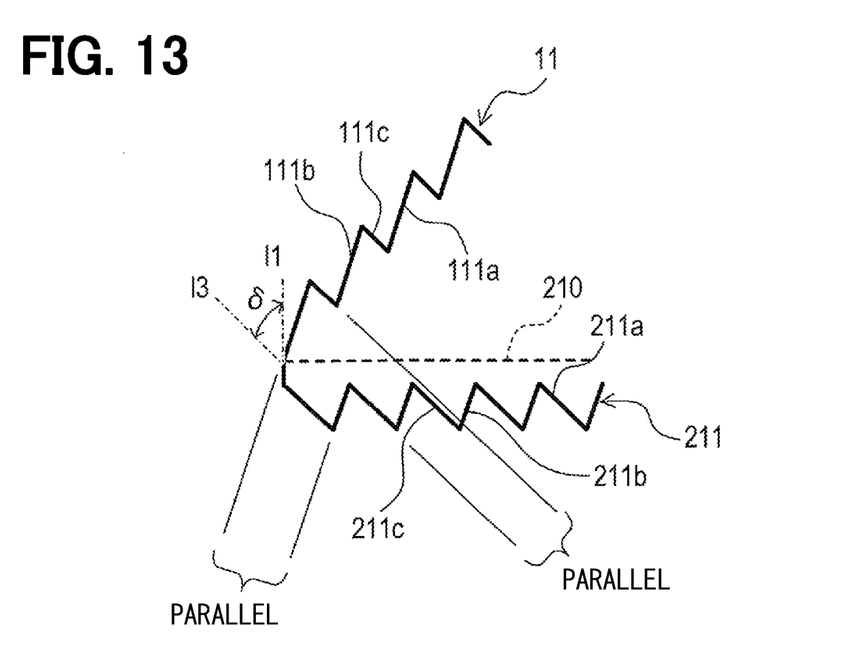
FIG. 13 is a diagram showing a configuration of an incident portion and an emission portion according to the third embodiment.

As shown in FIG. 13, the incident portion 11 is composed of a prism array in which multiple prisms 111a are arranged. By configuring the incident portion 11 with the prism array, the height Td can be made smaller than that of the first and second embodiments by utilizing the step of the prism array while maintaining the first inclination angle ψ.

Each of the prisms 111a includes an incident side surface 111b and an incident facing surface 111c that faces the incident side surface 111b. The incident side surface 111b is inclined at the first inclination angle ψ with respect to the first normal line l1. That is, the incident side surface 111b and the emission side surface 211b are parallel to each other. The light L from the external scene incident from the incident side surface 111b and is emitted from the emission side surface 211b. Since the incident side surface 111b and the emission side surface 211b are parallel to each other, a color dispersion of the light L at the time of incident is canceled out at the time of emission.

A light absorption film is arranged on the incident facing surface 111c. Further, the incident facing surface 111c is parallel to the emission facing surface 211c. Further, the incident facing surface 111c and the emission facing surface 211c are inclined by a predetermined angle with respect to the first normal line l1. This predetermined angle is a value close to the incident angle θ. The inclination angle δ of the third normal line l3 with respect to the first normal line l1 is equal to the inclination angle of the second normal line l2, and the relationship between the inclination angle δ and the first inclination angle ψ satisfy $\delta+\psi=\pi/2$. As described above, the condition of $\theta+\psi<\varphi+\psi<\pi/2$ is satisfied in order to reduce the thickness. Therefore, $\varphi<\delta$ is satisfied, and the inclination angle δ is larger than the internal reflection angle φ. The third normal l3 is the normal of the incident side surface 111b. As a result, it is possible to suppress the omission of the optical path, and suppress prism slopes from being viewed by the user.

The incident portion 11 may be changed to a prism sheet in which multiple prisms 111a are arranged, or may be changed to another periodic structure. The prism array and the prism sheet are examples of a second periodic structure.

<3-2. Effects>

According to the third embodiment described in detail above, the effects (1) and (3) of the above-described first embodiment are obtained, and further, the following effects can be obtained.

(5) Since the incident portion 11 includes the prism array, the height Td can be reduced while maintaining the first inclination angle ξ as compared with the case where the incident portion 11 is a smooth surface.

(6) Since the emission side surface 211b and the incident side surface 111b are configured in parallel, the color dispersion of the light L at the time of incident can be canceled out at the time of emission.

(7) Since the incident facing surface 111c and the emission facing surface 211c are configured in parallel, it is possible to suppress the prism slopes from being viewed by the user.

Other Embodiments

While the embodiments of the present disclosure has been described above, the present disclosure is not limited to the above embodiments and can be variously modified as exemplified below.

(a) The light guide member 102 according to the second embodiment includes the incident portion 10. However, the light guide member 102 may include an incident portion composed of a diffraction grating or a diffractive optical member such as a hologram instead of the incident portion 10.

(b) Multiple functions of one element in the above embodiments may be implemented by multiple elements, or one function of one element may be implemented by multiple elements. Further, multiple functions of multiple elements may be implemented by one element, or one function implemented by multiple elements may be implemented by one element. A part of the configuration of the above embodiments may be omitted. At least a part of the configuration of the above embodiments may be added to or replaced with the configuration of another one of the above embodiments.

What is claimed is:

1. A light guide member comprising:
an incident portion having a first side and a second side opposite to the first side, and configured to allow an external light from an external scene to be incident on;
an emission portion being in contact with the first side of the incident portion to be inclined with respect to the incident portion, and configured to transmit a part of the external light incident on the emission portion and reflect another part of the external light incident on the emission portion;
a reflection portion disposed in parallel with the emission portion to be separated from the emission portion, and configured to reflect the external light incident on the reflection portion; and
an inclined portion connecting the second side of the incident portion and a side of the reflection portion close to the incident portion, wherein
an internal reflection angle inside the reflection portion and the emission portion is larger than an incident angle of the external light in a light guide cross section that is a plane defined by a first normal line and a second normal line, the first normal line is a normal line of the emission portion, the second normal line is a normal line of the incident portion, and the incident angle is an angle of the external light with respect to the first normal line,
a first inclination angle that is an inclination angle of the incident portion with respect to the first normal line is smaller than the internal reflection angle,
a height from the emission portion to the second side of the incident portion in a direction parallel to the first normal line is larger than a distance between the emission portion and the reflection portion, and
a second inclination angle that is an inclination angle of the inclined portion with respect to the first normal line is smaller than the internal reflection angle,
wherein the inclined portion is inclined so as to intersect a surface of the reflection portion.

2. The light guide member according to claim 1, wherein the height is equal to or less than twice the distance.

3. The light guide member according to claim 1, wherein a sum of the first inclination angle and the internal reflection angle is smaller than $\pi/2$.

4. The light guide member according to claim 1, wherein the emission portion has a first periodic structure.

5. The light guide member according to claim 4, wherein the incident portion has the first periodic structure.

6. The light guide member according to claim 4, wherein the first periodic structure includes a diffraction grating or a hologram.

7. The light guide member according to claim 1, wherein the emission portion has a double structure including a reflection and transmission portion and a second periodic structure.

8. The light guide member according to claim 7, wherein the incident portion has the second periodic structure.

9. The light guide member according to claim 8, wherein the second periodic structure includes a prism array or a prism sheet in which a plurality of prisms are arranged along the light guide cross section.

10. The light guide member according to claim 9, wherein
each of the plurality of prisms in the emission portion includes an emission side surface configured to emit the external light and an emission facing surface that faces the emission side surface,
each of the plurality of prisms in the incident portion includes an incident side surface configured to allow the external light to be incident on and an incident facing surface that faces the incident side surface, and
the emission side surface is configured to be parallel to the incident side surface.

11. The light guide member according to claim 10, wherein
the emission facing surface is configured to be parallel to the incident facing surface.

12. The light guide member according to claim 1, wherein the internal reflection angle is a total reflection angle.

13. The light guide member according to claim 1, wherein the inclined portion has a light absorbing member.

14. The light guide member according to claim 1, wherein
the incident angle has a range from a first incident angle to a second incident angle larger than the first incident angle, and
the internal reflection angle is a reflection angle when the incident angle is the second incident angle.

15. The light guide member according to claim 1, wherein
the internal reflection angle has a range from a first reflection angle to a second reflection angle larger than the first reflection angle, and
the second inclination angle is smaller than the first reflection angle.

16. The light guide member according to claim 1, wherein
the inclined portion includes a first end portion connected to the reflection portion and a second end portion connected to the second side, and
the inclined portion is inclined in such a manner that a distance in the direction parallel to the first normal line between the inclined portion and the emission portion increases from the first end portion to the second end portion.

* * * * *